United States Patent
Sippel et al.

(10) Patent No.: US 10,808,560 B2
(45) Date of Patent: Oct. 20, 2020

(54) TURBINE VANE ASSEMBLY WITH CERAMIC MATRIX COMPOSITE COMPONENTS

(71) Applicants: Rolls-Royce North American Technologies Inc., Indianapolis, IN (US); Rolls-Royce Corporation, Indianapolis, IN (US)

(72) Inventors: Aaron D. Sippel, Zionsville, IN (US); Ted J. Freeman, Danville, IN (US); David J. Thomas, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 226 days.

(21) Appl. No.: 16/013,385

(22) Filed: Jun. 20, 2018

(65) Prior Publication Data

US 2019/0390558 A1    Dec. 26, 2019

(51) Int. Cl.
| | |
|---|---|
| *F01D 9/04* | (2006.01) |
| *F01D 11/00* | (2006.01) |
| *F01D 9/06* | (2006.01) |
| *F01D 5/18* | (2006.01) |

(52) U.S. Cl.
CPC ............ *F01D 9/042* (2013.01); *F01D 5/189* (2013.01); *F01D 9/065* (2013.01); *F01D 11/001* (2013.01)

(58) Field of Classification Search
CPC .......... F01D 9/042; F01D 9/065; F01D 5/189; F01D 11/001
See application file for complete search history.

(56) References Cited

U.S. PATENT DOCUMENTS

| | | | |
|---|---|---|---|
| 4,285,634 A * | 8/1981 | Rossman | ............... F01D 5/284 416/241 B |
| 4,326,835 A | 4/1982 | Wertz | |
| 4,645,421 A | 2/1987 | Huether | |
| 4,790,721 A * | 12/1988 | Morris | ................... F01D 5/187 416/241 B |
| 5,078,576 A | 1/1992 | Hayton | |
| 7,452,189 B2 * | 11/2008 | Shi | ......................... F01D 5/147 415/200 |
| 7,648,336 B2 * | 1/2010 | Cairo | ..................... F01D 9/042 415/209.4 |
| 8,015,705 B2 | 9/2011 | Wilson et al. | |
| 8,292,580 B2 * | 10/2012 | Schiavo | ................. F01D 5/189 416/229 A |
| 8,475,132 B2 | 7/2013 | Zhang et al. | |
| 9,045,990 B2 | 6/2015 | Alvanos et al. | |
| 9,822,655 B2 * | 11/2017 | Beaujard | ................. F01D 5/282 |
| 9,970,307 B2 * | 5/2018 | Kanjiyani | .............. F01D 9/041 |
| 10,227,881 B2 * | 3/2019 | Gallet | ....................... F01D 5/26 |
| 10,612,399 B2 * | 4/2020 | Freeman | ................. F01D 5/284 |

(Continued)

*Primary Examiner* — Woody A Lee, Jr.
(74) *Attorney, Agent, or Firm* — Barnes & Thornburg LLP (57) ABSTRACT

A turbine vane assembly includes an airfoil, a support strut, and an inner seal panel. The airfoil is formed to include an interior region of the airfoil. The support strut is located in the interior region of the airfoil and configured to carry loads that act on the airfoil. The inner seal panel extends at least partway about the axis to resist fluid communication between a region upstream of the inner seal panel and a region downstream of the inner seal panel.

20 Claims, 5 Drawing Sheets

(56) References Cited

U.S. PATENT DOCUMENTS

| | | | |
|---|---|---|---|
| 2009/0003993 A1* | 1/2009 | Prill | F01D 5/284 |
| | | | 415/134 |
| 2014/0161623 A1 | 6/2014 | Zurmehly et al. | |
| 2016/0123163 A1* | 5/2016 | Freeman | F01D 9/042 |
| | | | 415/200 |
| 2017/0022833 A1* | 1/2017 | Heitman | F01D 25/243 |
| 2018/0230826 A1* | 8/2018 | Vetters | F01D 5/3084 |
| 2020/0080429 A1* | 3/2020 | Vetters | F01D 25/005 |

* cited by examiner

TURBINE VANE ASSEMBLY WITH CERAMIC MATRIX COMPOSITE COMPONENTS

FIELD OF THE DISCLOSURE

The present disclosure relates generally to gas turbine engines, and more specifically to vanes used in gas turbine engines that include ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The integration of ceramic matrix composite materials into static vane assemblies is of interest because of the high-temperature capability of these materials. However, coupling ceramic matrix composite materials to other components included in gas turbine engines presents challenges based the mechanical characteristics of the various materials used (strength, coefficients of thermal expansion, etc.).

SUMMARY

The present disclosure may comprise one or more of the following features and combinations thereof.

A turbine vane assembly adapted for use in a gas turbine engine may include an airfoil, a support strut, and an inner seal panel. The airfoil may comprise ceramic matrix composite materials and may be shaped to interact with hot gases moving axially along a primary gas path of the gas turbine engine relative to an axis. The airfoil may include an inner surface and an outer surface. The inner surface may define an airfoil passageway that extends radially through the airfoil to provide an interior region of the airfoil. The outer surface may be located opposite the inner surface and may be configured to interact with the hot gases.

The support strut may comprise metallic materials. The support strut may be located in the interior region of the airfoil and arranged to carry loads applied to the airfoil by the hot gases during use of the turbine vane assembly.

The inner seal panel may be coupled with the support strut and arranged to resist fluid communication between a pressurized region located upstream of the inner seal panel and a pressurized region located downstream of the inner seal panel. The inner seal panel may include a seal member and a first airfoil support. The seal member may extend circumferentially at least partway about the axis. The first airfoil support may extend radially outward away from the seal member. A portion of the first airfoil support may be located between the support strut and the inner surface of the airfoil to transmit the loads from the airfoil to the support strut.

In some embodiments, the first airfoil support may include a coupler band and a load pad. The coupler band may be coupled with and extend radially away from the seal member. The load pad may extend away from the coupler band and engage the inner surface of the airfoil.

In some embodiments, the turbine vane assembly may include an inner endwall comprising ceramic matrix composite materials. The inner endwall may be shaped to define a boundary of the primary gas path near a radial end of the airfoil. The load pad may be located radially inward of the boundary of the primary gas path.

In some embodiments, the first airfoil support may include a shoulder that extends circumferentially away from the coupler band. The shoulder may be located radially between the airfoil and the seal member to block radial inward movement of the airfoil relative to the support strut.

In some embodiments, the support strut may include a strut body, a strut tail that extends radially inward away from the strut body, and a retainer. The retainer may extend into the strut tail and the coupler band included in the first airfoil support to couple the inner seal panel with the support strut.

In some embodiments, the coupler band included in the first airfoil support may directly engage the strut tail. In some embodiments, the inner seal panel may include a shim located between the strut tail and the coupler band to locate the inner seal panel relative to the support strut. In some embodiments, the seal member may include an outer band and an abradable layer coupled to the outer band.

In some embodiments, the inner seal panel may include a second airfoil support spaced apart circumferentially from the first airfoil support. At least a portion of the second airfoil support may be located between the airfoil and the support strut.

In some embodiments, the airfoil may be formed to define airfoil cutouts in a radial inner end of the airfoil. The inner seal panel may include a plurality of keys that extend axially away from the first airfoil support and are located in the airfoil cutouts to block relative movement between the airfoil and the inner seal panel.

According to another aspect of the present disclosure, a turbine vane assembly may include an airfoil, a support strut, and an inner seal panel. The airfoil may include an inner surface that defines an airfoil passageway that extends radially through the airfoil relative to an axis to provide an interior region of the airfoil and an outer surface opposite the inner surface. The support strut may be located in the interior region of the airfoil. The inner seal panel may extend at least partway about the axis. At least a portion of the inner seal panel may be located between the support strut and the inner surface of the airfoil to transmit loads to the support strut during use of the turbine vane assembly.

In some embodiments, the inner seal panel may include a seal member and a first airfoil support. The seal member may extend circumferentially at least partway about the axis. The first airfoil support may extend radially outward away from the seal member. The support strut may include a strut body and a retainer that extends into the first airfoil support and the strut body to couple the inner seal panel with the support strut.

In some embodiments, the first airfoil support may include a first coupler band, a first shoulder, and a first load pad. The first coupler band may be coupled with the seal member for movement therewith. The first shoulder may extend circumferentially away from the first coupler band and may be located radially between the airfoil and the seal member to block radial movement of the airfoil. The first load pad may extend radially away from the first coupler band and the first shoulder and may engage the inner surface of the airfoil.

In some embodiments, the inner seal panel may include a second airfoil support spaced apart circumferentially from the first airfoil support. The second airfoil support may include a second coupler band, a second shoulder, and a second load pad. The second coupler band may be independent of the seal member. The second shoulder may extend circumferentially away from the second coupler band and may be located radially between the airfoil and the seal member to block radial movement of the airfoil. The second load pad may extend radially away from the second coupler band and the second shoulder and engage the inner surface of the airfoil.

In some embodiments, the inner seal panel may include a shim located between the support strut and the first coupler band to locate the first airfoil support relative to the support strut and the airfoil. In some embodiments, the inner seal panel may be interlocked with the airfoil to block relative movement between the airfoil and the inner seal panel.

In some embodiments, the support strut may include a strut body, a strut tail that extends radially inward away from the strut body, and a retainer. The inner seal panel may include a seal member, a first airfoil support coupled with the seal member, and a second airfoil support. The retainer may extend into the strut tail, the first airfoil support, and the second airfoil support to couple together the support strut, the first airfoil support, and the second airfoil support.

In some embodiments, the turbine vane assembly may include an inner endwall arranged at least partway around a radial inner end of the airfoil to define a boundary of a flow path through the turbine vane assembly. The inner seal panel may include a seal member that extends circumferentially at least partway about the axis and a first airfoil support that extends radially outward away from the seal member. The seal member may be located radially between the axis and the inner endwall.

In some embodiments, the at least a portion of the inner seal panel located between the support strut and the inner surface of the airfoil may be located radially inward of the boundary defined by the inner endwall. In some embodiments, the seal member may include an outer band and an abradable layer coupled to the outer band.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
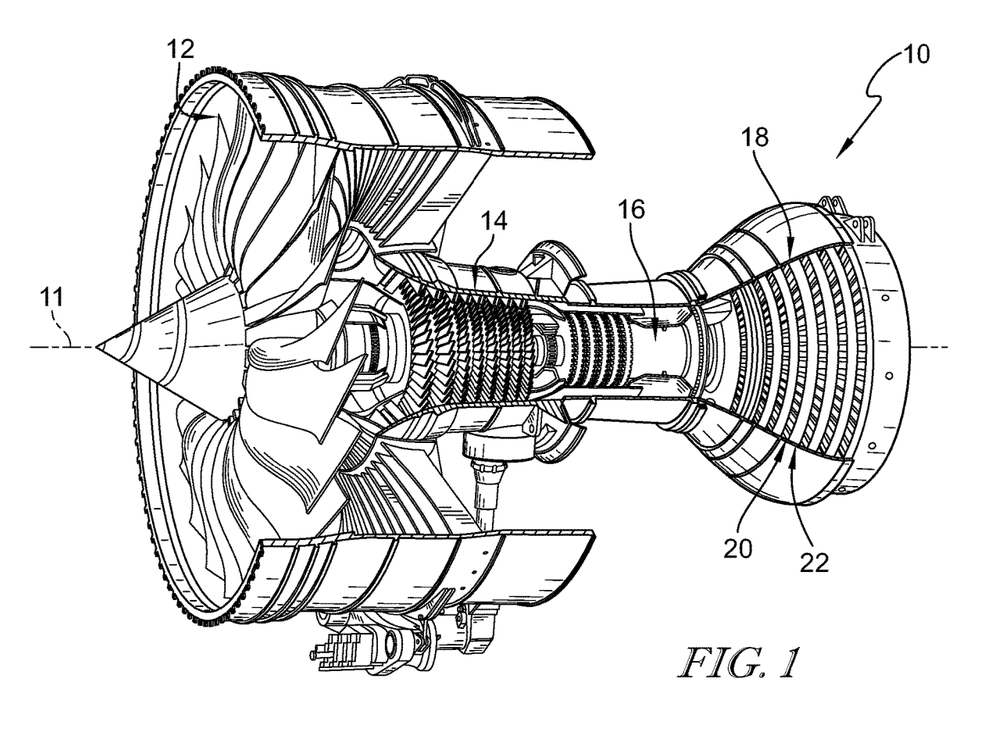
FIG. 1 is cutaway view of a gas turbine engine that includes a fan, a compressor, a combustor, and a turbine and the turbine includes a plurality of turbine vane assemblies shown with greater detail in FIGS. 2-4 and a plurality of turbine wheel assemblies.
Figure 2:
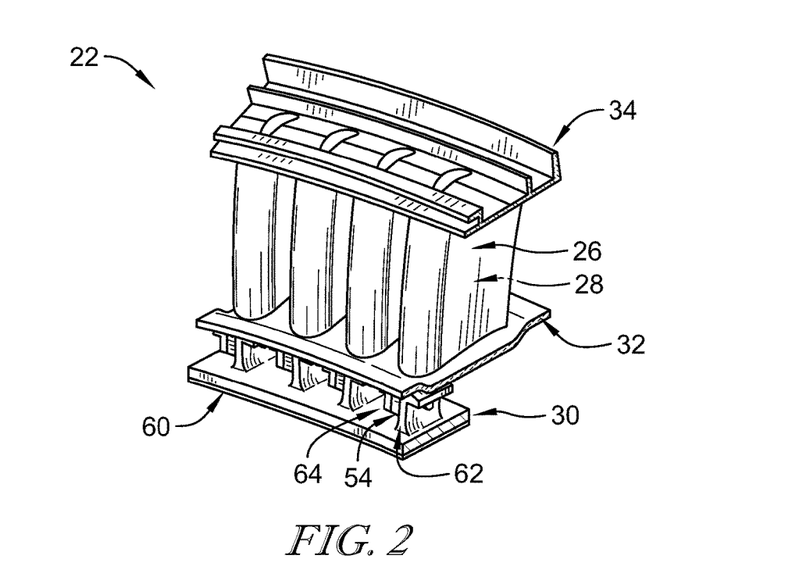
FIG. 2 is a perspective view of a portion of a turbine vane assembly included in the gas turbine engine of FIG. 1 showing that the turbine vane assembly includes an outer endwall, an inner endwall, a plurality of ceramic airfoils located radially between the outer endwall and the inner endwall, and an inner seal panel that transmits loads from the inner seal panel and the airfoils to support struts located in the airfoils.

A turbine vane assembly 22 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as shown in FIG. 1. Each turbine wheel assembly 20 includes a plurality of turbine blades that interact with the hot combustion gases to rotate the turbine wheel assembly 20 about an axis 11 of the gas turbine engine 10 to generate power for driving the compressor 14 and the fan 12. The turbine vane assembly 22 is located between turbine wheel assemblies 20 to conduct gases received from an upstream turbine wheel assembly 20 toward a downstream turbine wheel assembly 20.

Figure 3:
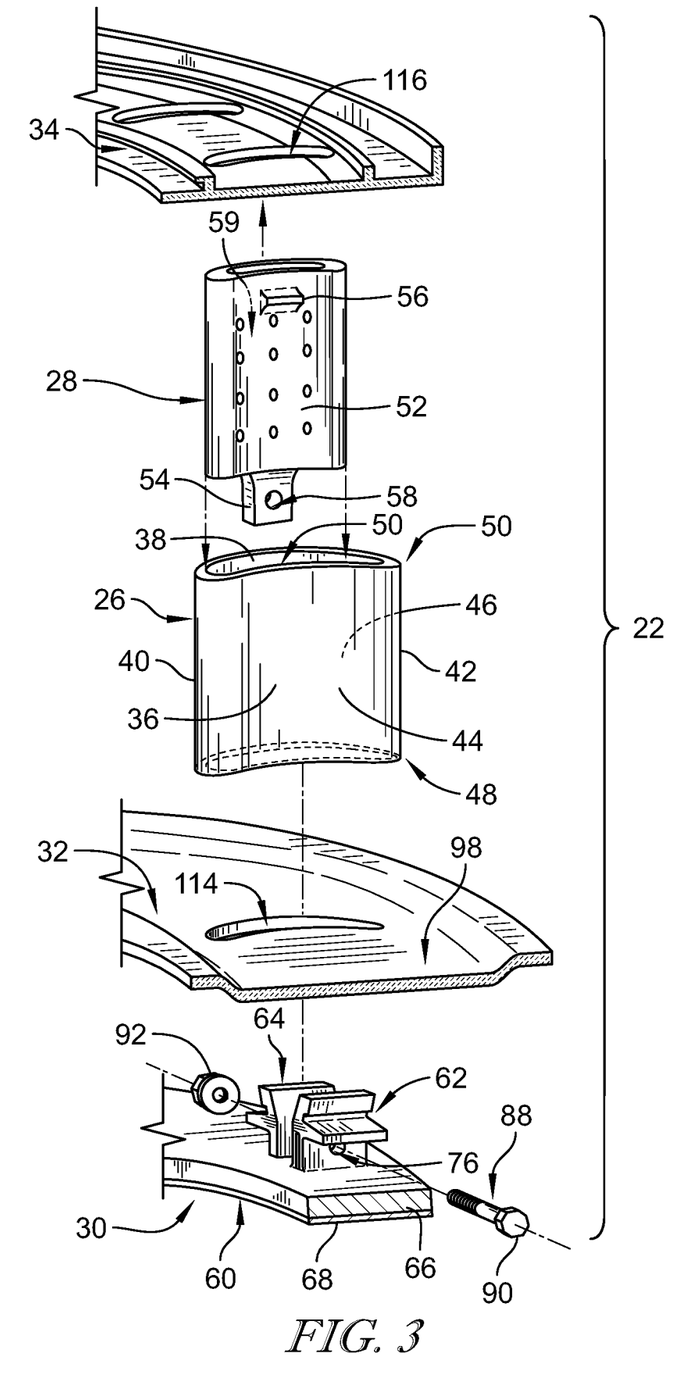
FIG. 3 is an exploded perspective assembly view of the turbine vane assembly of FIG. 2 showing that the turbine vane assembly includes the outer endwall, the metallic support strut, one of the ceramic airfoils, the inner endwall, and the inner seal panel configured to transmit loads from the ceramic airfoil to the metallic support strut during operation of the gas turbine engine.

A section of one of the turbine vane assemblies 22 is shown in FIG. 2. The turbine vane assembly 22 includes airfoils 26, support struts 28, and an inner seal panel 30 as shown in FIGS. 2 and 3. In the illustrative embodiment, the turbine vane assembly 22 further includes an inner endwall 32 and an outer endwall 34 located at radial ends of the airfoils 26. The airfoils 26 are shaped to interact with hot gases moving axially along a primary gas path 21 of the gas turbine engine 10. The support struts 28 are located in interior regions 45 of the airfoils 26 to carry loads that act on the airfoils 26 and the inner seal panel 30 during operation of the gas turbine engine 10 as suggested in FIG. 4. The inner seal panel 30 provides a seal between pressurized regions of the gas turbine engine 10 and transmits loads from the inner seal panel 30 and the airfoils 26 to the support struts 28.

Each of the plurality of airfoils 26 and each of the plurality of support struts 28 are substantially similar in the illustrative embodiment. A turbine vane assembly of the present disclosure may include one or more airfoils 26 and one or more support struts 28. As such, a single airfoil 26 and a single support strut 28 are discussed below. In some embodiments, the turbine vane assembly 22 is formed from a plurality of segments. Each segment may include one or more airfoil 26 and a corresponding number of support struts 28. In the illustrative embodiment, the turbine vane assembly 22 is a full hoop arranged around the axis 11.

The airfoil 26 includes an outer surface 36 and an inner surface 38 as shown in FIG. 3. The outer surface 36 is airfoil shaped and defines a leading edge 40, a trailing edge 42, a pressure side 44 that extends between the leading edge 40 and the trailing edge 42, and a suction side 46 that extends between the leading edge 40 and the trailing edge 42. The inner surface 38 is spaced apart from the outer surface 36 and defines an interior region 45 of the airfoil. The interior region 45 extends radially through a radial inner end 48 and a radial outer end 50 of the airfoil 26.

Figure 4:
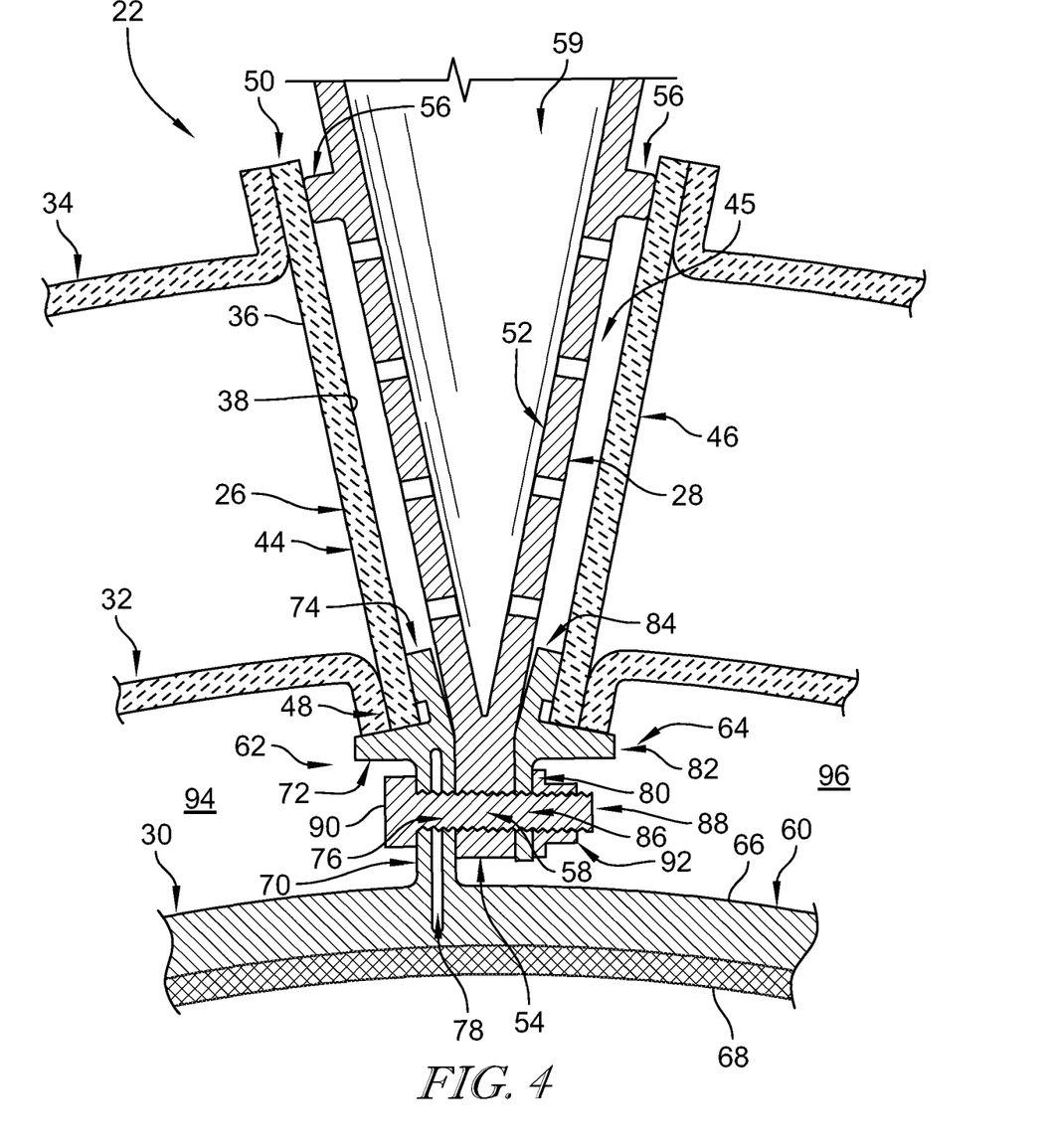
FIG. 4 is a diagrammatic view of a section of the turbine vane assembly of FIG. 2 showing that the metallic support strut is located in an interior region of the ceramic airfoil and the inner seal panel includes a load pad located between the ceramic airfoil and the metallic support structure and configured to transmit the loads acting on the ceramic airfoil to the metallic support strut during operation of the gas turbine engine.

The airfoil 26 is shaped to direct the hot gases moving in the primary gas path 21 toward a downstream turbine wheel assembly 20 as suggested in FIG. 4. Illustratively, the airfoil 26 is a one-piece integral component. The airfoil 26 comprises ceramic matrix composite materials in the illustrative embodiment. The airfoil 26 comprises only ceramic matrix composite materials in the illustrative embodiment. In other embodiments, the airfoil 26 comprises metallic materials.

The support strut 28 includes a strut body 52, a strut tail 54, load pads 56, and a retainer 88 as shown in FIGS. 3 and 4. The strut body 52 is generally airfoil shaped and includes an interior region 59 that extends radially inward into the strut body 52. The strut tail 54 extends radially inwardly away from the strut body 52 toward the axis 11. The load pads 56 extend away from the strut body 52 and engage the inner surface 38 of the airfoil 26. Illustratively, the strut body 52, the strut tail 54, and the load pads 56 are integrally formed. The support strut 28 comprises metallic materials in the illustrative embodiment.

The strut body 52 is located in the interior region 45 of the airfoil 26 as shown in FIG. 4. The strut body 52 includes a plurality of cooling holes that extend through a wall of the strut body 52 and open into the interior region 59 of the strut body 52. The strut body 52 is solid and rigid. A portion of the strut body 52 extends radially outward beyond the outer endwall 34 as shown in FIG. 4.

The strut tail 54 extends radially beyond the radial inner end 48 of the airfoil and through the inner endwall 32 and couples with the inner seal panel 30 as shown in FIG. 4. As a result, the inner seal panel 30 is coupled with and supported by the support strut 28. In the illustrative embodiment, the strut tail 54 includes generally planar sides and is formed to define a strut passageway 58 that extends circumferentially through the strut tail 54. The passageway 58 is sized to receive the retainer 88. In other embodiments, the strut passageway 58 extends axially through the strut tail 54. In some embodiments, the strut tail 54 is cylindrical shaped and includes threads that mate with the inner seal panel 30. In other embodiments, the strut tail 54 may be other suitable shapes.

Figure 5:
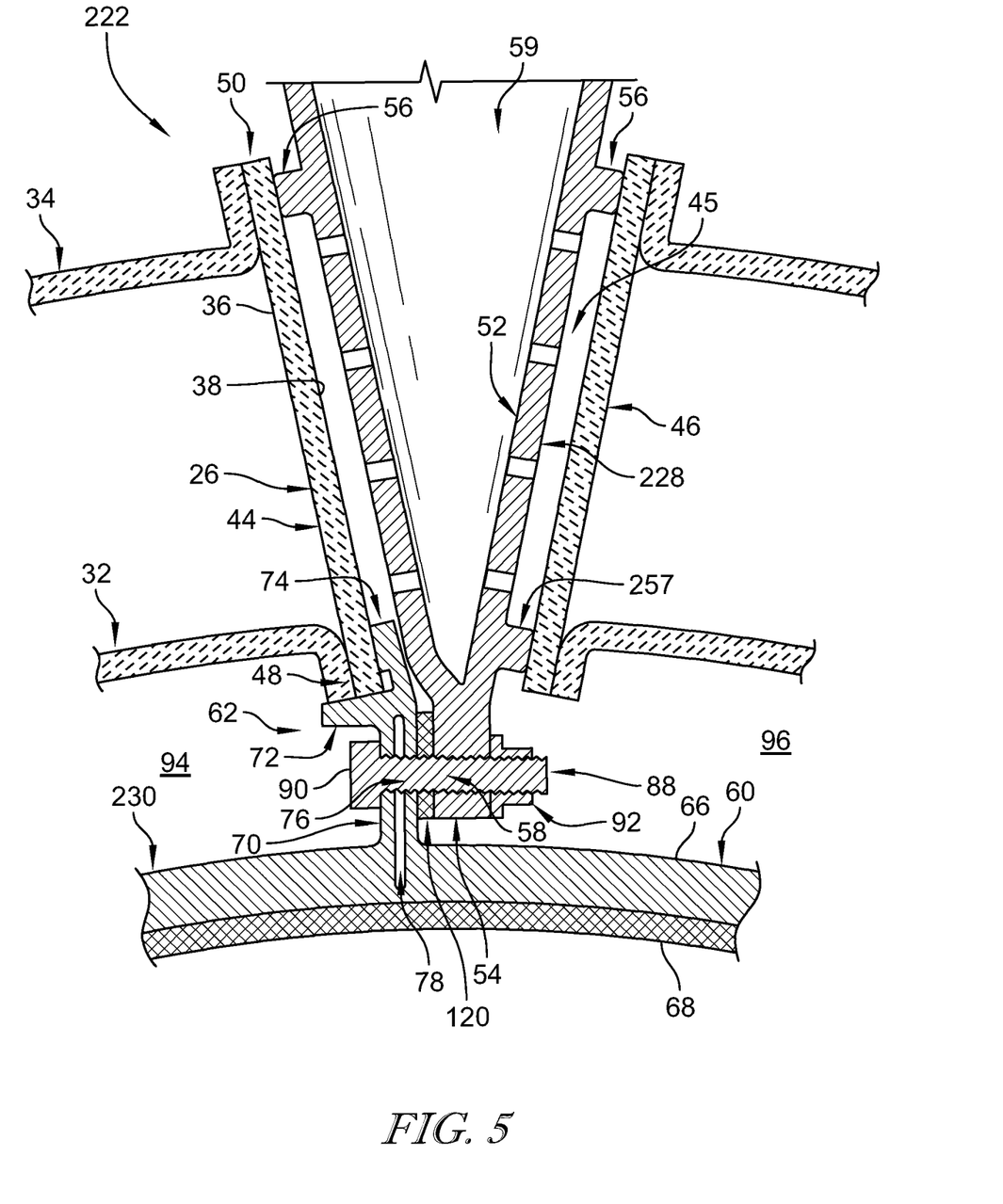
FIG. 5 is a diagrammatic view of a section of another turbine vane assembly adapted for use in the gas turbine engine of FIG. 1 showing a shim located between the inner seal panel and the support strut and that the support strut includes a load pad for locating the ceramic airfoil on a suction side of the turbine vane assembly.

The load pads 56 are coupled to the strut body 52 and engage the inner surface 38 of the airfoil 26 to locate the airfoil 26 relative to the support strut 28 to provide a gap between the airfoil 26 and the strut body 52 and to transmit loads from the airfoil 26 to the support strut 28 as shown in FIG. 4. A first load pad 56 engages the pressure side 44 of the inner surface 38 and a second load pad 56 engages the suction side 46 of the inner surface 38. The load pads 56 are located radially toward the radial outer end 50 of the airfoil 26 and the outer boundary of the primary gas path 21 to that the metallic load pads 56 interface with the ceramic airfoil 26 toward the outer edges of the boundary of the primary gas path 21 and away from a center of the primary gas path 21 where the temperatures may be the highest. Such radial locating of the load pads 56 may reduce chemical interaction between the ceramic and metal materials. In some embodiments, one or more load pads 56 are located toward the radial inner end 48 of the airfoil 26 as shown in FIG. 5.

The inner seal panel 30 is arranged circumferentially around the axis 11 and is adapted to resist fluid communication between a pressurized region 94 located axially upstream of the inner seal panel 30 and a pressurized region 96 located axially downstream of the inner seal panel 30 as suggested in FIG. 4. The inner seal panel 30 is coupled with the strut tail 54 to couple the inner seal panel 30 with the support strut 28.

The inner seal panel 30 includes a seal member 60, a first airfoil support 62, and a second airfoil support 64 as shown in FIG. 4. The seal member 60 extends around the axis 11 and resists fluid communication between the pressurized region 94 and the pressurized region 96. Portions of the first airfoil support 62 and the second airfoil support 64 are arranged between the airfoil 26 and the support strut 28 to transmit the loads from the ceramic matrix composite airfoil 26 to the metallic support strut 28 so that the support strut 28 carries the loads acting on the airfoil 26 and on the inner seal panel 30 as suggested in FIG. 4.

The seal member 60 is an annular full hoop member that extends around the axis 11 in the illustrative embodiment. In other embodiments, the seal member 60 may be a segment that extends circumferentially partway around the axis 11.

The seal member 60 includes an outer band 66 and an abradable layer 68 as shown in FIG. 4. The outer band 66 is rigid and extends around the axis 11. The outer band 66 comprises metallic materials in the illustrative embodiment. The outer band 66 is an annular full hoop component in the illustrative embodiment. In other embodiments, the seal member 60 may include a plurality of outer band segments that are arranged around the axis 11. The outer band 66 extends at least partway about the axis 11. The abradable layer 68 is coupled to an inner surface of the outer band 66 and is configured to interface with a rotor to resist pressurized air from passing between the inner seal panel 30 and the rotor.

The first airfoil support 62 includes a first coupler band 70, a first shoulder 72, and a first load pad 74 as shown in FIG. 4. The first coupler band 70 is coupled with and extends radially outward away from the outer band 66 of the seal member 60. The first shoulder 72 extends away from the first coupler band 70 and is configured to locate the airfoil 26 radially. The first load pad 74 extends away from the first coupler band 70 and is configured to receive the loads from the inner surface 38 of the airfoil 26. The first airfoil support 62 is made of metallic materials and the first coupler band 70, the first shoulder 72, and the first load pad 74 are integrally formed in the illustrative embodiment.

The first coupler band 70 is formed to define a first coupler passageway 76 that extends through the first coupler band 70 and receives the retainer 88 as shown in FIG. 4. The first coupler band 70 is further formed to define a slot 78 for reducing weight of the component and may be used to receive cooling air to cool the inner seal panel 30. The first coupler passageway 76 extends circumferentially as shown in FIG. 4. The first coupler band 70 extends axially and radially in the illustrative embodiment as shown in FIG. 3. In other embodiments, the first coupler band 70 extends circumferentially about the axis 11. The first coupler band 70 may be a full hoop about the axis 11 or it may be a discrete segment that extends partway about the axis 11. In other embodiments, the first coupler passageway 76 extends axially through the first coupler band 70.

Figure 6:
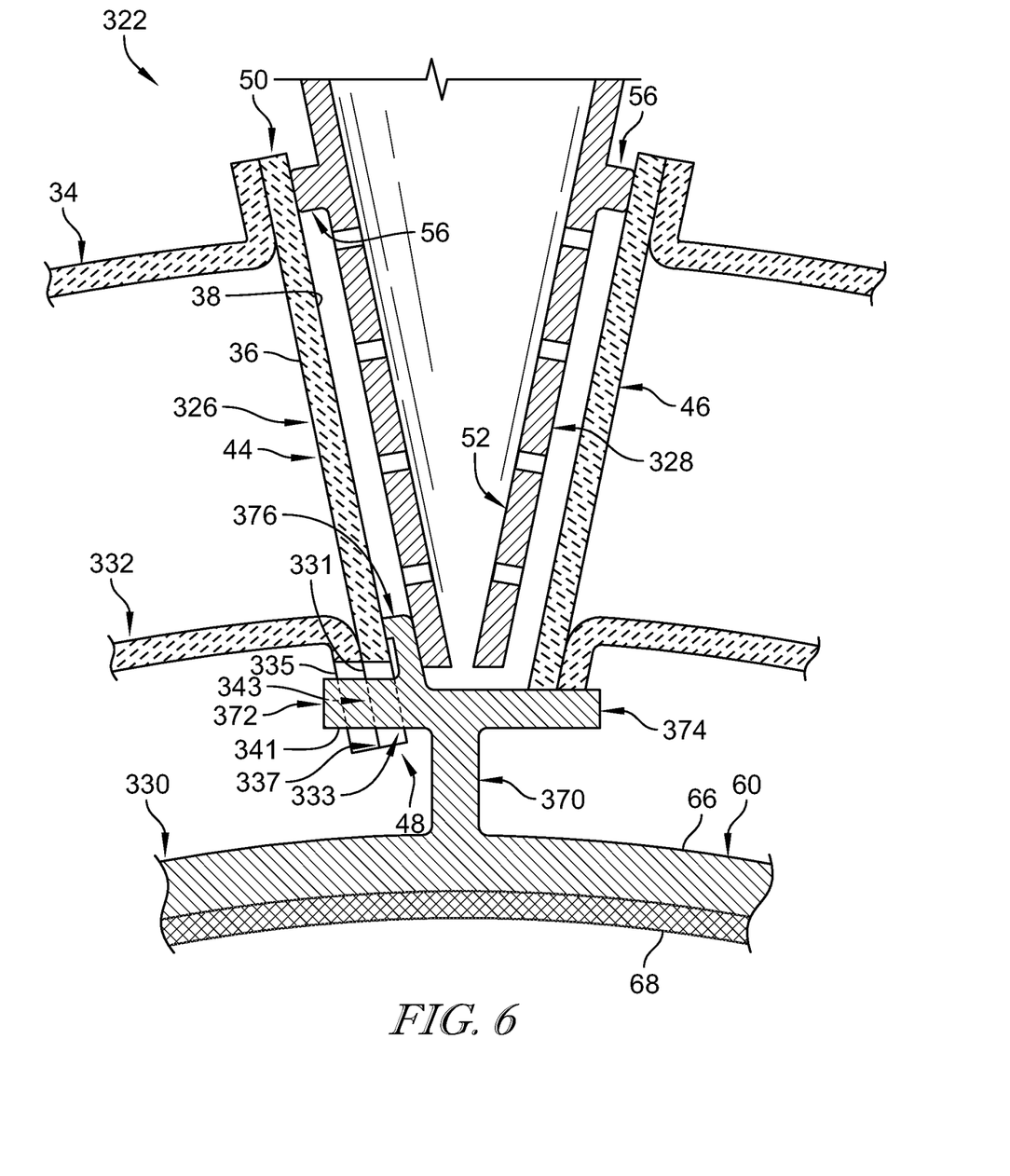
FIG. 6 is a diagrammatic view of a section of another turbine vane assembly adapted for use in the gas turbine engine of FIG. 1 showing that the airfoil, inner endwall, and inner seal panel are keyed together at the forward end of the turbine vane assembly to block relative movement between the components.

The first shoulder 72 is spaced radially apart from the seal member 60 and extends circumferentially away from the first coupler band 70 as shown in FIG. 4. The first shoulder 72 is located radially between the seal member 60 and the radial inner end 48 of the pressure side 44 of the airfoil 26. The first shoulder 72 is configured to block radial inward movement of the airfoil 26 so as to locate radially the airfoil 26 relative to the axis 11. In some embodiments, the first shoulder 72 extends axially away from the coupler band 70. In the illustrative embodiment, the first shoulder 72 further blocks radial inward movement of the inner endwall 32. In some embodiments, the first shoulder 72 is formed to include cutouts for interlocking with the airfoil 26 to block movement of the airfoil 26 as shown in FIG. 6.

The first load pad 74 is configured to transmit the loads acting on the airfoil 26 to the support strut 28 directly and/or through the first coupler band 70 to the strut tail 54 included in the support strut 28 as suggested in FIG. 4. The first load pad 74 extends radially and circumferentially away from the first coupler band 70 to interface with the inner surface 38 of the airfoil 26 as shown in FIG. 4. In the illustrative embodiment, the first load pad 74 engages directly the inner surface 38 of the airfoil 26. The first load pad 74 is located at the radial inner end 48 of the airfoil 26 toward the boundary of the primary gas path 21. As a result, the interface between the metallic load pad 74 and the ceramic matrix composite airfoil 26 is located away from the hottest part of the gas path 21 to minimize chemical interactions between the metal and ceramic matrix composite materials.

The second airfoil support 64 includes a second coupler band 80, a second shoulder 82, and a second load pad 84. The second coupler band 80 is independent of the outer band 66 of the seal member 60 and is formed to define a second coupler passageway 86 that extends through the second coupler band 80. The second shoulder 82 extends circumferentially away from the second coupler band 80 and is configured to locate the suction side 46 of the airfoil 26 radially. The second load pad 84 extends radially away from the second coupler band 80 and is configured to receive the loads from the inner surface 38 of the airfoil 26.

The second airfoil support 64 is substantially similar to the first airfoil support 62 as suggested in FIG. 4. The second airfoil support 64 is made of metallic materials and the second coupler band 80, the second shoulder 82, and the second load pad 84 are integrally formed in the illustrative embodiment to provide a single component. In other embodiments, the second airfoil support 64 may be omitted as shown in FIG. 5.

The retainer 88 extends through the first coupler passageway 76, the strut passageway 58, and the second coupler passageway 86 to couple the first airfoil support 62 and the second airfoil support 64 to the support strut 28 as shown in FIG. 4. The retainer 88 includes a bolt 90 and a nut 92. In other embodiments, the retainer 88 includes one or more of a nut, bolt, pin, and snap ring.

A shim 120 may be located between the strut tail 54 and the first airfoil support 62 to locate the first airfoil support 62 relative to the support strut 28 and/or the airfoil 26 as shown in FIG. 5. In particular, the shim 120 may be used to locate the load pad 74 relative to the inner surface 38 so that the inner surface 38 does not need to be machined or to minimize machining of the inner surface 38. A shim 120 may be located between the strut tail 54 and the second airfoil support 64 in other embodiments, for example, the embodiment shown in FIG. 4.

The turbine vane assembly 22 further includes the inner endwall 32 and the outer endwall 34 as shown in FIGS. 2-4. The inner endwall 32 is arranged around at least a portion of the radial inner end of the airfoil 26 to define an inner boundary of the primary gas path 21. The outer endwall 34 is arranged around at least a portion of the radial outer end of the airfoil 26 to define an outer boundary of the primary gas path 21.

The inner endwall 32 extends circumferentially about the axis 11 as suggested in FIGS. 3 and 4. The inner endwall 32 is an annular full hoop member in the illustrative embodiment. In other embodiments, the inner endwall 32 is a segment that extends circumferentially partway about the axis and a plurality of endwall segments are arranged about the axis 11 to define the primary gas path boundary. The inner endwall 32 is formed to include a depression 98 as shown in FIGS. 3 and 4. The inner endwall 32 is formed to define an endwall passageway 114 that extends radially through the inner endwall 32 as shown in FIG. 3. The endwall passageway 114 is sized to receive the radial inner end 48 of the airfoil 26.

The inner endwall 32 comprises ceramic matrix composite materials in the illustrative embodiment. In other embodiments, the inner endwall 32 comprises metallic materials. Illustratively, the inner endwall 32 and the airfoil 26 are formed as separate components. In other embodiments, the inner endwall 32 and the airfoil 26 are integrally formed.

The outer endwall 34 is arranged around the airfoil 26 at the radial outer end of the airfoil 26 as shown in FIG. 4. The outer endwall 34 is formed to define an endwall passageway 116 shaped to receive the radial outer end 50 of the airfoil 26. In some embodiments, the outer endwall 34 and the airfoil 26 are integrally formed. The outer endwall 34 comprises ceramic matrix composite materials in the illustrative embodiment. In other embodiments, the outer endwall 34 comprises metallic materials.

Another embodiment of a turbine vane assembly 222 in accordance with the present disclosure is shown in FIG. 5. The turbine vane assembly 222 is substantially similar to the turbine vane assembly 22 shown in FIGS. 1-4 and described herein. Accordingly, similar reference numbers in the 200 series indicate features that are common between the turbine vane assembly 22 and the turbine vane assembly 222. The description of the turbine vane assembly 22 is incorporated by reference to apply to the turbine vane assembly 222, except in instances when it conflicts with the specific description and the drawings of the turbine vane assembly 222.

The turbine vane assembly 222 includes the airfoil 26, a support strut 228, an inner seal panel 230, the inner endwall 32, and the outer endwall 34 as shown in FIG. 5. The inner seal panel 230 includes the seal member 60 and the first airfoil support 62. The second airfoil support 64 is omitted in the embodiment of FIG. 5. In such embodiments, a radial inner load pad 257 is coupled to the strut body 52 included in the support strut 228 to interface with the suction side 46 of the airfoil 26. A shim 120 is located between the strut tail 54 and the first airfoil support 62 to locate the coupler band 70 and the first load pad 74 included in the inner seal panel 30.

Another embodiment of a turbine vane assembly 322 in accordance with the present disclosure is shown in FIG. 6. The turbine vane assembly 322 is substantially similar to the turbine vane assembly 22 shown in FIGS. 1-4 and described herein. Accordingly, similar reference numbers in the 300 series indicate features that are common between the turbine vane assembly 22 and the turbine vane assembly 322. The description of the turbine vane assembly 22 is incorporated by reference to apply to the turbine vane assembly 322, except in instances when it conflicts with the specific description and the drawings of the turbine vane assembly 322.

The turbine vane assembly 322 includes an airfoil 326, a support strut 328, an inner seal panel 330, an inner endwall 332, and the outer endwall 34 as shown in FIG. 6. The inner seal panel 330 is configured to interlock with the airfoil 326 and the inner seal panel 330. The airfoil 326 is formed to include airfoil keys 331 at the radial inner end 48 of the airfoil 326 to define airfoil cutouts 333 between the airfoil keys 331. The inner endwall 332 includes endwall keys 335 to define endwall cutouts 337 between the endwall keys 335. The inner seal panel 330 is formed to include panel keys 341 that interlock with the airfoil keys 331 and the endwall keys 335 to block relative movement between the airfoil 326, the inner seal panel 330, and the inner endwall 332.

The inner seal panel 330 includes the seal member 60 and an airfoil support 362 as shown in FIG. 6. The airfoil support 362 includes a coupler band 370, a first shoulder 372, a second shoulder 374, and a load pad 376. The coupler band 370 extends radially away from the seal member 60. The first shoulder 372 extends away from the coupler band 370 in a first direction and the second shoulder 374 extends away from the coupler band 370 in a second direction opposite the first direction. The load pad 376 extends radially away from the coupler band 370 and is adapted to transmit loads from the airfoil 326 to the support strut 328.

The first shoulder 372 is formed to include the panel keys 341 that define panel cutouts 343 between neighboring panel keys 341 as shown in FIG. 6. The panel keys 341 extend into the airfoil cutouts 333 and the endwall cutouts 337. As such, the first shoulder 372 is interlocked with the airfoil 326 to block relative movement between the inner seal panel 330 and the airfoil 326.

In the illustrative embodiment, the inner seal panel 330 is an integral one-piece component. The support strut 328 includes the strut body 52 and the strut tail 54 is omitted in the illustrative embodiment.

The present disclosure may aid in the introduction of ceramic matrix composite materials into the turbine of gas turbine engines. Using ceramic matrix composite material may allow the reduction of cooling air usage, an increase in turbine entry temperatures, weight savings, and an overall increase in turbine efficiency.

The vane assembly 22 according to the present disclosure includes ceramic matrix composite airfoils 26, ceramic matrix composite end walls 32, 34, a metallic support structure 28, and metallic inner seal panel 30. In one embodiment, the ceramic matrix composite features are the airfoil 26 and the end walls 32, 34. Contact between the metallic support strut 28 and the ceramic matrix composite airfoil 26 occurs outside of the flow path region of the primary gas path 21 where the temperatures are lower and managing the thermal growths may be easier.

The inner seal panel 30 may have an abradable coating 68 on the inner diameter which may be rubbed in by a knife seal. The delta pressure across the inner seal panel 30 may generate a load that is reacted by the strut 28 and transferred to an outer casing. The present disclosure directs this load to be transferred directly to the strut 28 without passing through the ceramic matrix composite airfoil 26. The inner seal panel 30 may have an arm 74 that extends outward and in between the ceramic matrix composite airfoil 26 and the metal strut 28. This arm 74 may help to position the airfoil 26 to control the gap between the airfoil 26 and the strut 28. It is also positioned to transfer the inner seal pressure loads directly into the strut 28.

For assembly purposes, a locating pin clocks the inner seal if the inner seal panel 30 is a single full hoop feature by cross keying to the CMC airfoil as shown in FIG. 4. The inner seal panel 330 may be segmented in other embodiments.

In some embodiments, the metallic strut 28 necks down to a flange 54 protruding radially inward from the airfoil 26. The inner seal panel 30 then has flange extending radially outward, integral to the seal body that contains a load pad 74 for locating the pressure side 44 of the airfoil 26. There is also another component that sits on the aft side of the strut 28 which contains a load pad 84 for the suction side 46 of the airfoil 26. Optional shims 120 can be used to space the components to fit varying geometries from part to part, possibly eliminating the need to machine the inner surface of the airfoil 26.

The inner seal 30 and suction side support components also locate the ceramic matrix composite airfoil 26 radially by incorporating tabs 72, 82 that prevent the airfoil 26 from moving inward. In this way the inner seal 30 can be segmented and attached (possibly pinned) to the vane struts.

In some embodiments, the suction side (depicted) or pressure side load pad is an integral feature to the strut 28 as shown in FIG. 5. In such embodiments, the second airfoil support 64 may be omitted. The inner seal panel 30 is pinned to the strut 28. A single shim 120 may be used to fit the parts.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use in a gas turbine engine, the turbine vane assembly comprising an airfoil comprising ceramic matrix composite materials and shaped to interact with hot gases moving axially along a primary gas path of the gas turbine engine relative to an axis, the airfoil includes an inner surface that defines an airfoil passageway that extends radially through the airfoil to provide an interior region of the airfoil and an outer surface opposite the inner surface and configured to interact with the hot gases, a support strut comprising metallic materials and located in the interior region of the airfoil and arranged to carry loads applied to the airfoil by the hot gases during use of the turbine vane assembly, and an inner seal panel coupled with the support strut and arranged to resist fluid communication between a pressurized region located upstream of the inner seal panel and a pressurized region located downstream of the inner seal panel, the inner seal panel includes a seal member that extends circumferentially at least partway about the axis and a first airfoil support that extends radially outward away from the seal member, and a portion of the first airfoil support is located between and in contact with the support strut and the inner surface of the airfoil to transmit the loads from the airfoil to the support strut.

2. The turbine vane assembly of claim 1, wherein the first airfoil support includes a coupler band that is coupled with and extends radially away from the seal member and a load pad that extends away from the coupler band and engages the inner surface of the airfoil, wherein the load pad provides the portion of the first airfoil support.

3. The turbine vane assembly of claim 2, further comprising an inner endwall comprising ceramic matrix composite materials and shaped to define a boundary of the primary gas path near a radial end of the airfoil and the load pad is located radially inward of the boundary of the primary gas path.

4. The turbine vane assembly of claim 2, wherein the first airfoil support includes a shoulder that extends circumferentially away from the coupler band and the shoulder is located radially between the airfoil and the seal member to block radial inward movement of the airfoil relative to the support strut.

5. The turbine vane assembly of claim 4, wherein the support strut includes a strut body, a strut tail that extends radially inward away from the strut body, and a retainer that extends into the strut tail and the coupler band included in the first airfoil support to couple the inner seal panel with the support strut.

6. The turbine vane assembly of claim 5, wherein the coupler band included in the first airfoil support directly engages the strut tail.

7. The turbine vane assembly of claim 5, wherein the inner seal panel further includes a shim located between the strut tail and the coupler band to locate the inner seal panel relative to the support strut.

8. The turbine vane assembly of claim 2, wherein the seal member includes an outer band and an abradable layer coupled to the outer band.

9. The turbine vane assembly of claim 1, wherein the inner seal panel further includes a second airfoil support spaced apart circumferentially from the first airfoil support and at least a portion of the second airfoil support is located between the airfoil and the support strut.

10. The turbine vane assembly of claim 1, wherein the airfoil is formed to define airfoil cutouts in a radial inner end of the airfoil and the inner seal panel includes a plurality of keys that extend axially away from the first airfoil support and are located in the airfoil cutouts to block relative movement between the airfoil and the inner seal panel.

11. A turbine vane assembly comprising
an airfoil including an inner surface that defines an airfoil passageway that extends radially through the airfoil relative to an axis to provide an interior region of the airfoil and an outer surface opposite the inner surface,
a support strut located in the interior region of the airfoil, and
an inner seal panel located radially inward of the airfoil that extends circumferentially at least partway about the axis and at least a portion of the inner seal panel extending radially outward and being located between and in contact with the support strut and the inner surface of the airfoil to transmit loads to the support strut during use of the turbine vane assembly.

12. The turbine vane assembly of claim 11, wherein the inner seal panel includes a seal member that extends circumferentially at least partway about the axis and a first airfoil support that extends radially outward away from the seal member and the support strut includes a strut body and a retainer that extends into the first airfoil support and the strut body to couple the inner seal panel with the support strut.

13. The turbine vane assembly of claim 12, wherein the first airfoil support includes a first coupler band, a first shoulder, and a first load pad, the first coupler band is coupled with the seal member for movement therewith, the first shoulder extends circumferentially away from the first coupler band and is located radially between the airfoil and the seal member to block radial movement of the airfoil, and the first load pad extends radially away from the first coupler band and the first shoulder and engages the inner surface of the airfoil, wherein the first load pad provides the at least a portion of the inner seal panel.

14. The turbine vane assembly of claim 13, wherein the inner seal panel includes a second airfoil support spaced apart circumferentially from the first airfoil support, the second airfoil support includes a second coupler band, a second shoulder, and a second load pad, the second coupler band is independent of the seal member, the second shoulder extends circumferentially away from the second coupler band and is located radially between the airfoil and the seal member to block radial movement of the airfoil, and the second load pad extends radially away from the second coupler band and the second shoulder and engages the inner surface of the airfoil.

15. The turbine vane assembly of claim 13, wherein the inner seal panel further includes a shim located between the support strut and the first coupler band to locate the first airfoil support relative to the support strut and the airfoil.

16. The turbine vane assembly of claim 11, wherein the support strut includes a strut body, a strut tail that extends radially inward away from the strut body, and a retainer, the inner seal panel includes a seal member, a first airfoil support coupled with the seal member, and a second airfoil support, and the retainer extends into the strut tail, the first airfoil support, and the second airfoil support to couple together the support strut, the first airfoil support, and the second airfoil support.

17. The turbine vane assembly of claim 11, wherein the inner seal panel is interlocked with the airfoil to block relative movement between the airfoil and the inner seal panel.

18. The turbine vane assembly of claim 11, further comprising an inner endwall arranged at least partway around a radial inner end of the airfoil to define a boundary of a flow path through the turbine vane assembly, the inner seal panel includes a seal member that extends circumferentially at least partway about the axis and a first airfoil support that extends radially outward away from the seal member, and the seal member is located radially between the axis and the inner endwall.

19. The turbine vane assembly of claim 18, wherein the at least a portion of the inner seal panel located between the support strut and the inner surface of the airfoil is located radially inward of the boundary defined by the inner endwall.

20. The turbine vane assembly of claim 18, wherein the seal member includes an outer band and an abradable layer coupled to the outer band.

* * * * *